UNITED STATES PATENT OFFICE.

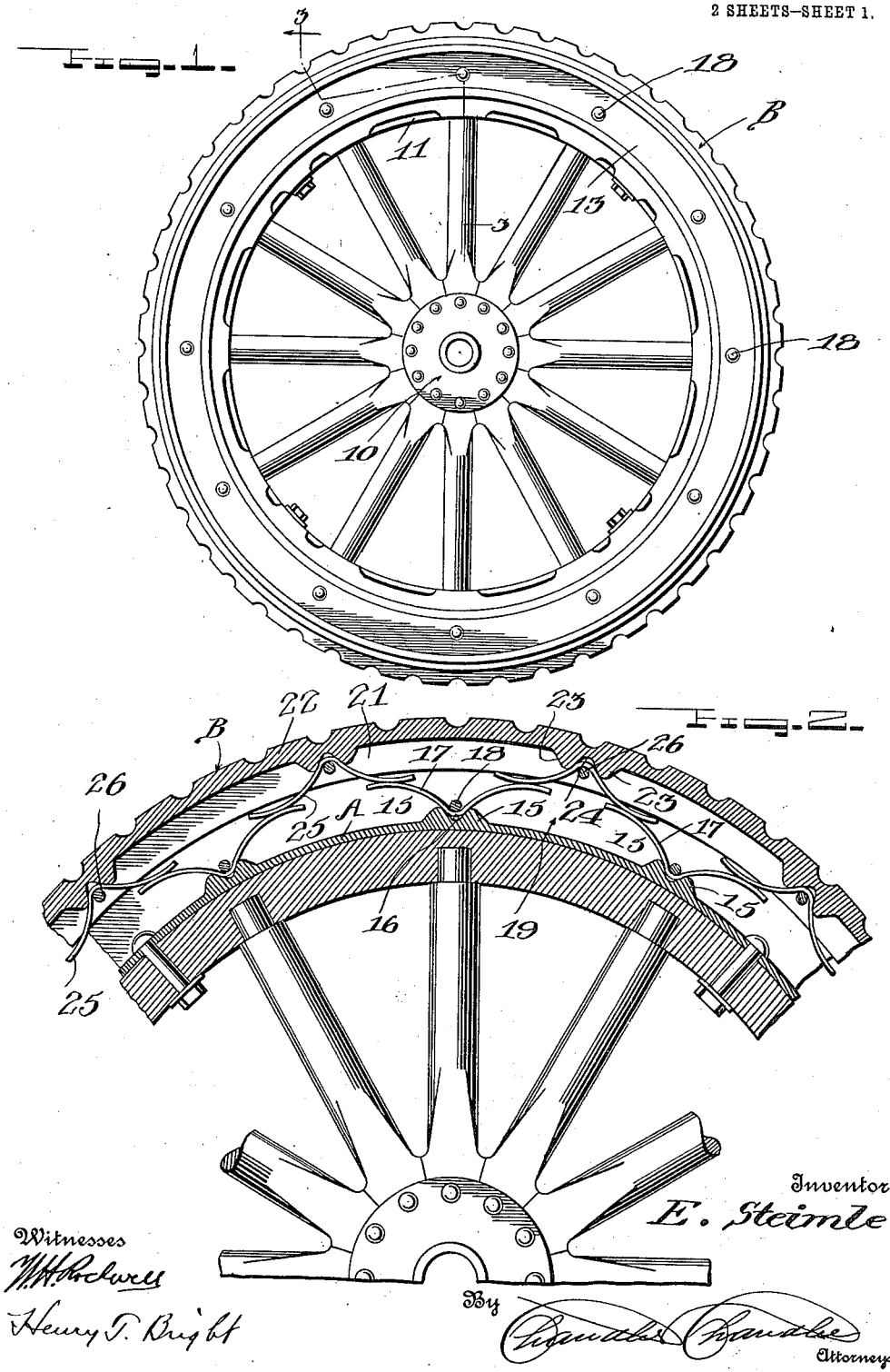

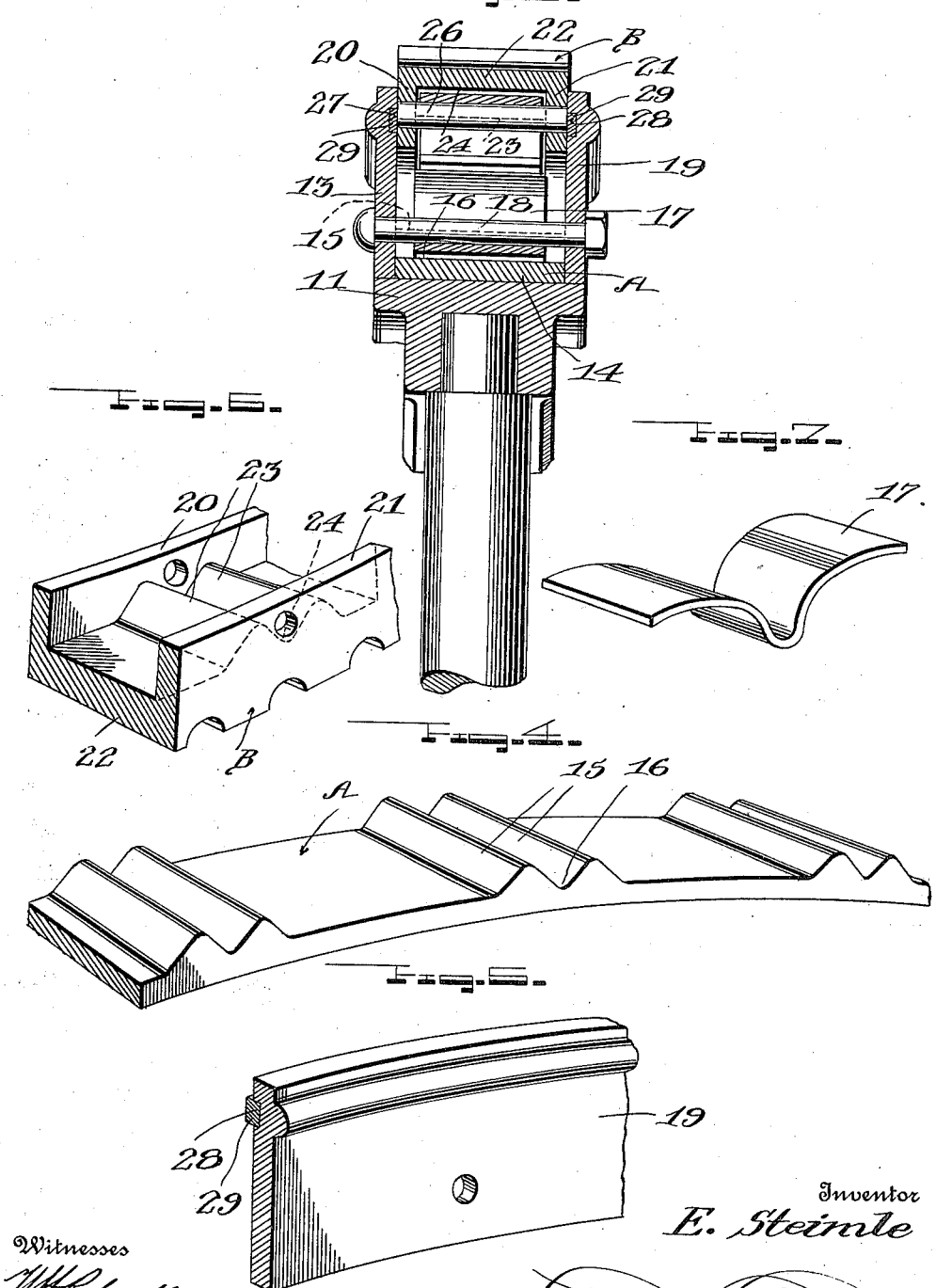

EMANUEL STEIMLE, OF SALT LAKE CITY, UTAH.

SPRING-TIRE.

1,023,770.   Specification of Letters Patent.   Patented Apr. 16, 1912.

Application filed June 1, 1911. Serial No. 630,605.

*To all whom it may concern:*

Be it known that I, EMANUEL STEIMLE, a citizen of the United States, residing at Salt Lake City, in the county of Salt Lake, State of Utah, have invented certain new and useful Improvements in Spring-Tires; and I do hereby declare the following to be a full, clear, and exact description of the invention, such as will enable others skilled in the art to which it appertains to make and use the same.

This invention relates to spring tires, and particularly to a type adapted for association with automobile wheels.

The object of the invention resides in the provision of a spring tire which when associated with an automobile wheel will effectually absorb the vibration incident to travel and resultant shock or jar obviated.

A further object of the invention resides in the provision of a tire of the character named which can be easily associated with an automobile wheel, and which will be comparatively light, strong and durable.

With the above and other objects in view the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 1 is a side elevation of an automobile wheel having the improved tire associated therewith, the latter being partly broken away, Fig. 2 a sectional elevation of an automobile wheel with the improved tire associated therewith, Fig. 3 a section on the line 3—3 of Fig. 1, Fig. 4 a fragmental detail perspective view of the inner ring of the tire, Fig. 5 a fragmental detail perspective view of the cover plate which is attached to the inner ring, Fig. 6, a fragmentary detail perspective view of the outer ring of the tire, and Fig. 7, a detail perspective view of one of the springs employed in the tire.

Referring to the drawings, 10 indicates the hub of an automobile wheel 11 the felly thereof and 12 the spokes connecting the hub and felly.

The tire, which is detachably secured upon the periphery of the felly 11, comprises an inner ring A which includes connected right angularly disposed portions 13 and 14, the former of which, when the tire is applied to a wheel, extends radially of the wheel and the latter contiguous to the periphery thereof. The portion 14 is provided on its inner face with a plurality of pairs of transversely disposed ribs 15 forming resultant groove 16. Seated in each of the grooves 16 is the apex of a V-shaped spring 17. Extending through the portion 13 transversely of the portion 14 is a plurality of bolts 18 which are disposed in the grooves 16 respectively and serve to hold the springs 17 in place. These bolts 18 also pass through an annular cover plate 19 and secure the latter to the inner ring A in spaced relation to the portion 13. The tire further comprises an outer ring or tread portion B which is of substantially U-shaped cross section and includes arms 20 and 21 and a connecting portion 22, the latter being provided on its outer face with transversely disposed eminences and depressions to form a gripping surface. The arms 20 and 21 extend between the portion 13 and the cover plate 19 and contact with the inner faces thereof respectively. The inner face of the connecting portion 22 is also provided with a plurality of pairs of transversely disposed ribs 23 and resultant grooves 24. Seated in each of the grooves 24 is the apex of a V-shaped leaf spring 25, the arms of which engage respectively the adjacent arms of successive springs 17. Connecting the arms 20 and 21 of the outer ring B is a plurality of pins 26 which are disposed respectively in the grooves 24 and serve to hold the springs 25 in place. The portion 13 and the cover plate 19 are provided on their inner faces with annular grooves 27 and 28 respectively in each of which is mounted a gasket 29 of leather or other suitable material which forms a liquid tight joint between the inner and outer ring but which at the same time allows said rings to move relatively to each other. This liquid tight connection between the inner and outer ends of the tire enables oil to be supplied to the space between said ring which will effect the proper lubrication of the movable parts of the tire, prevent wear and prolong the life thereof.

What is claimed is:

A spring tire comprising inner and outer ring members, the latter of which includes spaced side portions and a connecting portion, and the former an angularly disposed portion bearing against the outer face of one of the side portions of the outer ring member, a removable cover plate bearing against the outer face of the other side portion of the outer ring member and extending between the inner and outer ring members, a plurality of pairs of transversely disposed ribs and resultant grooves formed on the inner face of the connecting portion of the outer ring member, a plurality of V-shaped leaf springs having their apexes seated in respective grooves of the inner face of the connecting portion of the outer ring member, pins connecting the side portions of the outer ring members and disposed in said grooves to secure said leaf springs in place, a plurality of pairs of transversely disposed ribs and resultant grooves formed on the inner face of the portion of the inner ring member disposed parallel to the connecting portion of the outer ring member, a plurality of V-shaped leaf springs having their apexes seated in said last named grooves respectively and their arms in engagement respectively with adjacent arms of successive V-shaped springs carried by the outer ring member, and a plurality of bolts passing through the angular portion of the inner ring member and the cover plate and disposed in said last named grooves respectively to secure said last named leaf springs in place.

In testimony whereof, I affix my signature, in presence of two witnesses.

EMANUEL STEIMLE.

Witnesses:
F. B. WHITMORE,
THOMAS ALSTON, Jr.